(12) United States Patent
Winn et al.

(10) Patent No.: US 6,214,926 B1
(45) Date of Patent: Apr. 10, 2001

(54) SILICONE MEMBRANES FORMED WITHOUT THE USE OF 1-1-1 TRICHLOROETHANE

(75) Inventors: Alastair Winn; Roberto Jimenez, both of Ventura, CA (US)

(73) Assignee: Rhodia Inc., New Jersey, CA (US)

( * ) Notice: Subject to any disclaimer, the term of this patent is extended or adjusted under 35 U.S.C. 154(b) by 0 days.

(21) Appl. No.: 09/527,693

(22) Filed: Apr. 1, 1999

(51) Int. Cl.$^7$ .............................. C08L 83/04; C05K 5/02; A61F 2/12; B05D 3/02; B01F 1/00

(52) U.S. Cl. ........................ 524/588; 524/284; 524/356; 524/464; 524/468; 427/2.12; 427/2.24; 427/2.3; 427/387; 428/447; 106/311; 252/364; 422/901; 623/8

(58) Field of Search .................................. 524/464, 284, 524/356, 468, 588; 427/2.12, 2.24, 2.3, 387; 623/8; 428/447; 106/311; 252/364; 422/901

(56) References Cited

U.S. PATENT DOCUMENTS

| | | | | |
|---|---|---|---|---|
| 4,056,403 | * | 11/1977 | Cramer et al. | 134/22 R |
| 4,455,691 | | 6/1984 | Redinger et al. | . |
| 4,489,201 | * | 12/1984 | von Au et al. | 528/42 |
| 4,535,123 | * | 8/1985 | Sasaki et al. | 524/862 |
| 4,710,541 | * | 12/1987 | Tomita et al. | 525/104 |
| 4,731,081 | | 3/1988 | Tiffany et al. | . |
| 6,056,976 | * | 5/2000 | Markkula et al. | 424/486 |

* cited by examiner

Primary Examiner—Robert Dawson
Assistant Examiner—Jeffrey B Robertson
(74) Attorney, Agent, or Firm—Donald D. Mon

(57) ABSTRACT

A solvent mixture to disperse or dissolve a copolymer of methyl-trifluoropropyl siloxane and dimethylsiloxane, the solvent mixture comprising perchlorethylene, a selected acid ester, and a selected ketone. The invention also comprehends the combination of copolymer and solvent mixture.

6 Claims, No Drawings

SILICONE MEMBRANES FORMED WITHOUT THE USE OF 1-1-1 TRICHLOROETHANE

FIELD OF THE INVENTION

For forming modified permeability silicone membranes, non-flammable curable dispersions of siloxane copolymers suspended or dissolved in a non-flammable, evaporable solvent other than 1-1-1 trichloroethane.

BACKGROUND OF THE INVENTION

Membranes for anatomical prostheses such as breast prostheses are commonly formed by applying a solution or suspension of a copolymer and a solvent, evaporating the solvent and then curing the copolymer in place. One well-known copolymer is methyl-trifluoropropyl siloxane-dimethylsiloxane, available as a fluorosilicone elastomer dispersion.

For application this dispersion is dissolved in an evaporable solvent. A widely used solvent at the present time being 1.1.1 trichloroethane (for convenience hereafter referred to as "trichloro"), which functions well for this intended use. However, this solvent has been identified as an ozone depleter and is being phased out from industrial use. Other suitable solvents include chloro-fluorocarbon solvents with also have ozone depleting properties as well as high cost.

If it were not for the serious extraneous problems of trichloro, there would be little purpose for this invention. Its equivalent has been most elusive because of the necessity to produce a membrane from a deposited and cured copolymer that reliably provides a barrier against the migration through it of typical fillers such as dimethyl silicone-based gels, and also of materials such as are described in Tiffany U.S. Pat. No. 4,731,081 among others. All of this while being environmentally benign and non-flammable.

As one seeks substitutes for trichloro, it soon becomes evident that the obvious ones themselves often have serious drawbacks, for example, extreme flammability, hydroscopicity, and poor solubility of the dispersion or being ozone depleting. P. suitable replacement should be non-flammable, have a boiling point range between about 90 degrees to 150 degrees C., and be an excellent solvent with reasonable cost. These parameters are determined by the need to provide a good clear "true" solution, and also a safe one for use in the manufacturing process, and for environmental compatibility.

Further, for manufacturing a low-permeability membrane, it has been commonly assumed that a high mole percentage of the fluorosilicone moiety, perhaps as high as 90% mole ratio, should be used. Applicant has found that a surprisingly lower mole percent from 15–50% of this moiety can be used to form membranes which are as effective as those made from the higher mole percentage fluorosilicone when using the solvent of this invention when used to produce a membrane of reduced polarity and permeability to dimethyl silicone fluids.

BRIEF DESCRIPTION OF THE INVENTION

A curable dispersion dissolved or suspended in an evaporable solvent for application to a mold or form to make, after the solvent has evaporated and the dispersion has been cured, a low permeability membrane for a breast prosthesis resistant to migration of silicone gel through it.

According to the invention, the copolymer comprises a first moiety between about 10 mole % to about 40 mole % of methyltrifluoropropyl siloxane, and a second moiety between about 90 mole % and about 10 mole % of dimethylsiloxane. It is dissolved in a solvent mixture comprising between about 70% to about 97% of perchlorethylene and between about 3% to about 30% (all by weight) of a ketone, ether or acid ester with a boiling point range between about 70 degrees to 170 degrees C.

According to a preferred feature of this invention the acid esters are selected from the group consisting of ethylacetate, propylacetate and butylacetate. The ketones are selected from the group consisting of acetone, methyl ethyl, methyl propyl, methylisobutylketone, and methylbutylketone. Combinations of any of these are within the scope of this invention.

According to the presently preferred embodiment of the invention, the solvent is about 90% perchlorethylene and about 10% butylacetate.

All percentages are by weight except for the mole percentages for the copolymer.

DETAILED DESCRIPTION OF THE INVENTION

An optimized membrane can be formed with the use of this invention, because it can be made with a high percent of flourosilicone moiety relative to a dimethylsiloxane moiety, while utilizing an environmentally compatible solvent intended to be evaporated. Previously such relative percentages could be utilized only with 1-1-1 trichloroethane, or chloro-fluorocarbon which are becoming unacceptable solvents.

A copolymer comprising a first moiety between about 10 mole % to about 40 mole % methyl-trifluoropropyl siloxane and a second moiety between about 90 mole % and about 60 mole % of dimethyl siloxane is to be cured to form the membrane. A suitable and preferred copolymer is obtainable from Applied Silicone Corporation, under its part number PN 40032, with the solvent of this invention substituted for the 1-1-1 trichloroethane in it. The preferred ratio is about 25 mole % methyl-trifluoropropyl siloxane: 75 mole dimethyl siloxane %.

As previously stated, it has been a matter of considerable frustration to devise a suitable solvent. It is necessary to obtain a clear solution of the copolymer in order that it can properly be applied to a mold. Even the perchlorethylene used in this invention as a solvent did not produce a proper solution by itself, especially with a higher percentage of the fluorosilicone moiety. It came as an unpredictable surprise to the inventor herein that the addition of a minor amount of a specific additive to the perchlorethylene provided a non-flammable solvent mixture which resulted in a clear and acceptable suspension or solution in a wide range of percentages. It should be remembered that at whatever concentration the solvent mixture is originally applied, the concentration of solvent will gradually reduce to zero as the solvent is evaporated and the membrane is formed.

The search for a suitable solvent was greatly impeded by the requirement that the solvents to be used must be environmentally acceptable. The principal component of the solvent mixture is perchlorethylene, which is acceptable. To it is added an additive which is an acid ester selected from the group consisting of ethylacetate, propylacetate and butylacetate or mixtures thereof, or a ketone selected from the group consisting of acetone, methylisobutylketone, methyl, ethyl, ketone, methyl propyl, ketone and methyl butylketone. Mixtures of all or any of these members of groups may be used.

When the additive (or additives) is added to the perchlorethylene, there results a non-flammable solvent mixture which is environmentally acceptable, evaporates at an appropriate temperature, and leaves behind an acceptable layer to be cured to form a membrane.

Useful ratios of perchlorethylene to additive range from about 70% to 97% perchlorethylene to about 30% to 3% additive. The presently preferred solvent is about 90% perchlorethylene and about 10% butylacetate.

The copolymer is mixed and dissolved in the solvent mixture. It may be supplied as a one part ready-to-be-used catalyzed dispersion, or as a two part product comprising the silicone and solvent solution and a separate cross-linking catalyst, sometimes platinum.

The material is coated onto a form or mold by dipping, casting, knife coating, or brushing. After the solvent is evaporated, the deposited copolymer will be cured in place by application of heat, thereby to form a strong elastic membrane.

This invention is not to be limited by the embodiments described in the description, which are given by way of example and not of limitation, but only in accordance with the scope of the appended claims.

We claim:

1. A solvent mixture to disperse or dissolve a copolymer comprising a first moiety of methyl-trifluoropropyl siloxane and a second moiety of dimethylsiloxane in the ratio of about 10 mole % to 40 mole % of said first moiety to about 60 mole % to about 90% of said second moiety, said solvent mixture comprising perchlorethylene and an additive of one or more of the members of one or more of the following: an acid ester selected from the group consisting of ethylacetate, propylacetate, and butylacetate, and a ketone selected from the group consisting of acetone, methyl ethyl ketone, methyl propyl ketone, methylisobutylketone, methylbutylketone; said solvent mixture comprising between about 70% to about 97% by weight of perchlorethylene and about 30% to about 3% of said additive.

2. A solvent mixture according to claim 1 in which said solvent mixture comprises about 90% perchlorethylene and about 10% butylacetate.

3. In combination:
   a solvent mixture according to claim 1; and a copolymer comprising a first moiety of methyl-trifluoropropyl and a second moiety of dimethylsiloxane in the ratio of about 10 mole % to 40 mole % of said first moiety to about 60 mole % to about 90% of said second moiety.

4. A combination according to claim 3 in which said solvent mixture comprises about 90% perchlorethylene and about 10% butylacetate.

5. A process for forming a membrane useful in an inplantable medical device, comprising applying the combination of claim 3 to a mold or form, evaporating the solvent from it, and curing the deposited copolymer in place.

6. A process according to claim 5 in which said solvent mixture comprises about 90% perchlorethylene and about 10% butylacetate.

* * * * *